United States Patent [19]
Permut

[11] Patent Number: 5,517,473
[45] Date of Patent: May 14, 1996

[54] TRANSLATION AND ROTATION MECHANISM FOR CARTRIDGE LOADING

[75] Inventor: Ronald M. Permut, Louisville, Colo.

[73] Assignees: Sony Corporation, Park Ridge, N.J.; Sony Electronics Inc., Tokyo, Japan; a part interest

[21] Appl. No.: 457,041

[22] Filed: Jun. 1, 1995

Related U.S. Application Data

[63] Continuation of Ser. No. 102,858, Aug. 6, 1993.

[51] Int. Cl.$^6$ .................................................. G11B 17/22
[52] U.S. Cl. ............................. 369/36; 369/34; 414/782
[58] Field of Search ................................. 369/178, 35, 36, 369/34; 360/99.02, 99.03, 99.06, 99.07, 98.06; 414/280, 283, 769, 776, 779, 782, 744.4; 74/89.18, 33, 29

[56] References Cited

U.S. PATENT DOCUMENTS

| | | | |
|---|---|---|---|
| 4,878,137 | 10/1989 | Yamashita et al. | 360/98.06 |
| 4,879,615 | 11/1989 | Teranishi et al. | 369/178 |
| 4,903,140 | 2/1990 | Okamoto et al. | 369/195 |
| 5,025,436 | 6/1991 | Crain et al. | 360/99.06 |
| 5,056,073 | 10/1991 | Fitzgerald et al. | 369/34 |
| 5,062,093 | 10/1991 | Christie et al. | 360/36 |
| 5,141,388 | 8/1992 | Georgitsis et al. | 414/783 |
| 5,195,078 | 3/1993 | Ikedo et al. | 360/99.07 |

FOREIGN PATENT DOCUMENTS

| | | | |
|---|---|---|---|
| 61-48162 | 3/1986 | Japan | 360/99.06 |
| 61-180959 | 8/1986 | Japan | 360/99.06 |
| 1-217753 | 8/1989 | Japan . | |
| 3-192566 | 8/1991 | Japan | 369/178 |
| 84/02165 | 6/1984 | WIPO | 74/29 |

*Primary Examiner*—Stuart S. Levy
*Assistant Examiner*—Kevin M. Watkins
*Attorney, Agent, or Firm*—Limbach & Limbach

[57] ABSTRACT

An apparatus for translating and rotating a cartridge (such as an optical disk cartridge) which utilizes a U-shaped rack engaged with a non-translating (but rotating) pinion; a carrier for the cartridge connected to the rack, and a motor for spinning the pinion on its axis. The apparatus enables the cartridge to be inserted with a shutter face forward, and translates and rotates the cartridge into the final (loaded) position with the shutter face in the opposite direction.

10 Claims, 7 Drawing Sheets

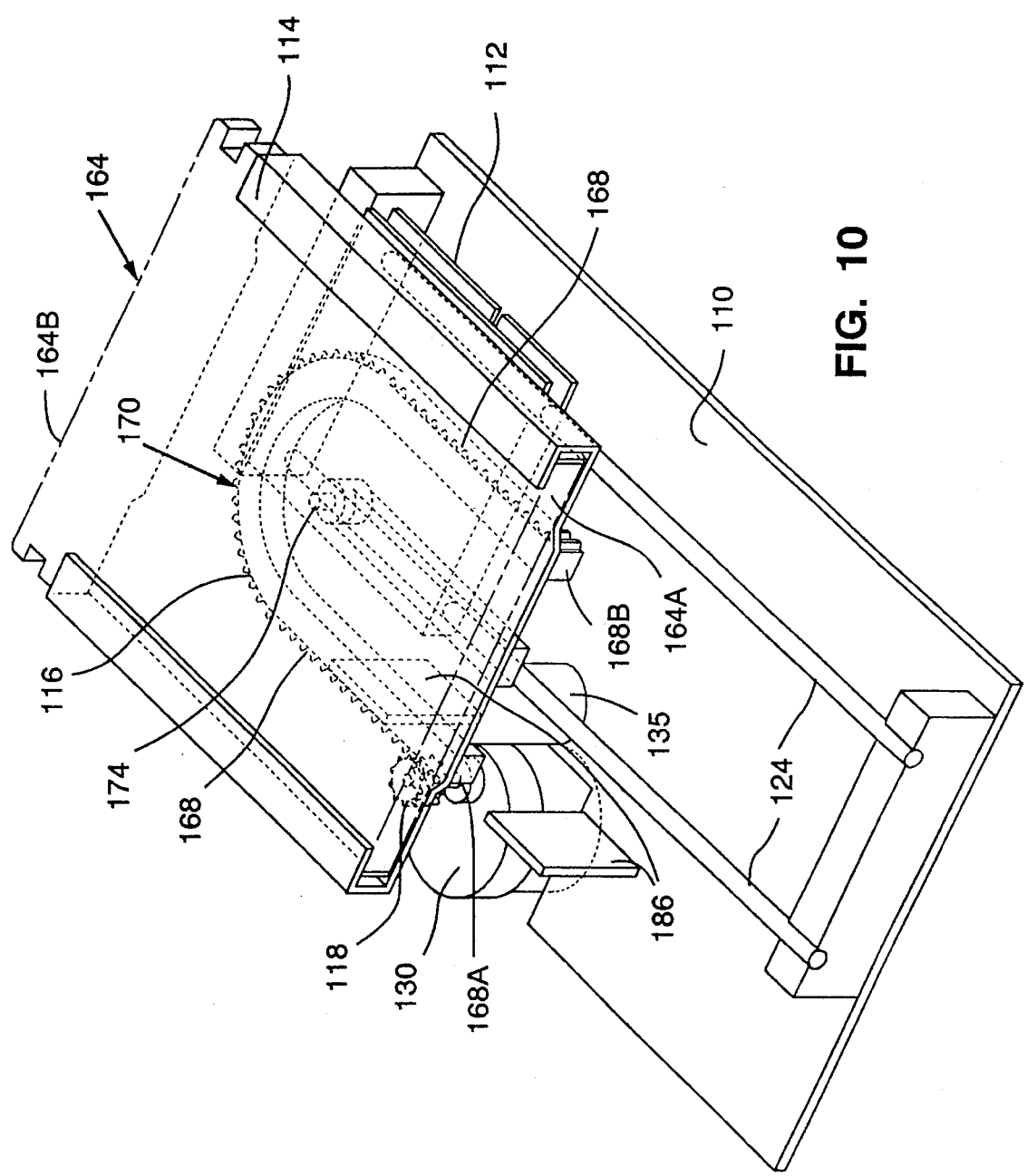

1

TRANSLATION AND ROTATION MECHANISM FOR CARTRIDGE LOADING

This is a continuation of application Ser. No. 08/102,858, filed Aug. 6, 1993.

FIELD OF THE INVENTION

The present invention relates to an apparatus for loading a cartridge, such as an optical disk cartridge, into an apparatus such as an optical library system.

BACKGROUND OF THE INVENTION

Optical disks are an increasingly popular medium for digitally storing information. Information is stored in binary format, with binary zeros represented by non-reflective pits stamped into a plastic disk and binary ones represented by reflective high points on the disk. The data is retrieved by an optical head which directs a laser source onto the surface of the disk and which utilizes a light sensitive photo diode to detect light reflecting from the disk surface. The binary information is converted to electrical signals and decoded into audio and/or video output.

In present large-scale optical disk storage and retrieval systems each disk is installed in a separate cartridge having a separate drive. Each cartridge is comprised of an enclosed casing which includes the disk and all of the components, including the drive mechanism, optical head, and electronics, which are necessary for retrieving the data from the disk. The cartridges are installed into the storage system via a slot in the system and are multiplexed to the central processing unit.

These disk cartridges are square in shape and have two large square faces which correspond to the top and bottom of the disk, and four thin rectangular faces which surround the disk. On one of the four faces is a shutter. The shutter provides a port through which the cartridge is interfaced to the central processing unit.

Many mass storage library systems require that the cartridge be inserted into the system shutter side last, which is opposite to the direction made customary by devices such as video cassette recorders and audio cassettes. Others allow for introduction of the shutter first, but rely on complex systems of cams and gears to rotate the cartridge for pick up by the cartridge selection mechanism of the library system.

OBJECT AND SUMMARY OF THE INVENTION

It is an object of the present invention to provide a mechanism for translating and rotating a cartridge. In preferred embodiments, the present invention is an apparatus for loading an optical disk cartridge into a storage library with the shutter side of the cartridge inserted first into the library.

The present invention is an apparatus which receives a cartridge, carries the cartridge in a linear direction, rotates the object 180°, and then continues to carry the object in a linear direction. The apparatus utilizes a rack and pinion system having a U-shaped rack which is engaged with a pinion. The rack is connected to a carrier which has a receptacle for holding the object. Operation of a motor drive spins the pinion, causing it to pull the rack and the carrier. The pinion first engages with a straight section of the U-shaped rack, causing the rack and carrier to move in a linear direction. The pinion then engages the curved section of the rack causing the carrier to rotate until the pinion engages the other straight section of the rack and guides the carrier back into linear travel.

The apparatus may be used to receive an optical disk cartridge (or other disk cartridge, such as a magnetic hard or floppy disk cartridge, a removable hard disk cartridge, or a compact disk cartridge) shutter side first into a disk storage library, carry the disk cartridge into the storage library, and rotate the disk so that it can be picked up by a cartridge selection mechanism for data retrieval. Other potential applications for the present invention include manufacturing processes, robotics, material handling, and food processing.

BRIEF DESCRIPTION OF THE DRAWINGS

FIG. 10 is a perspective view of an alternate embodiment of the present invention.

DETAILED DESCRIPTION OF THE INVENTION

Figure 1:
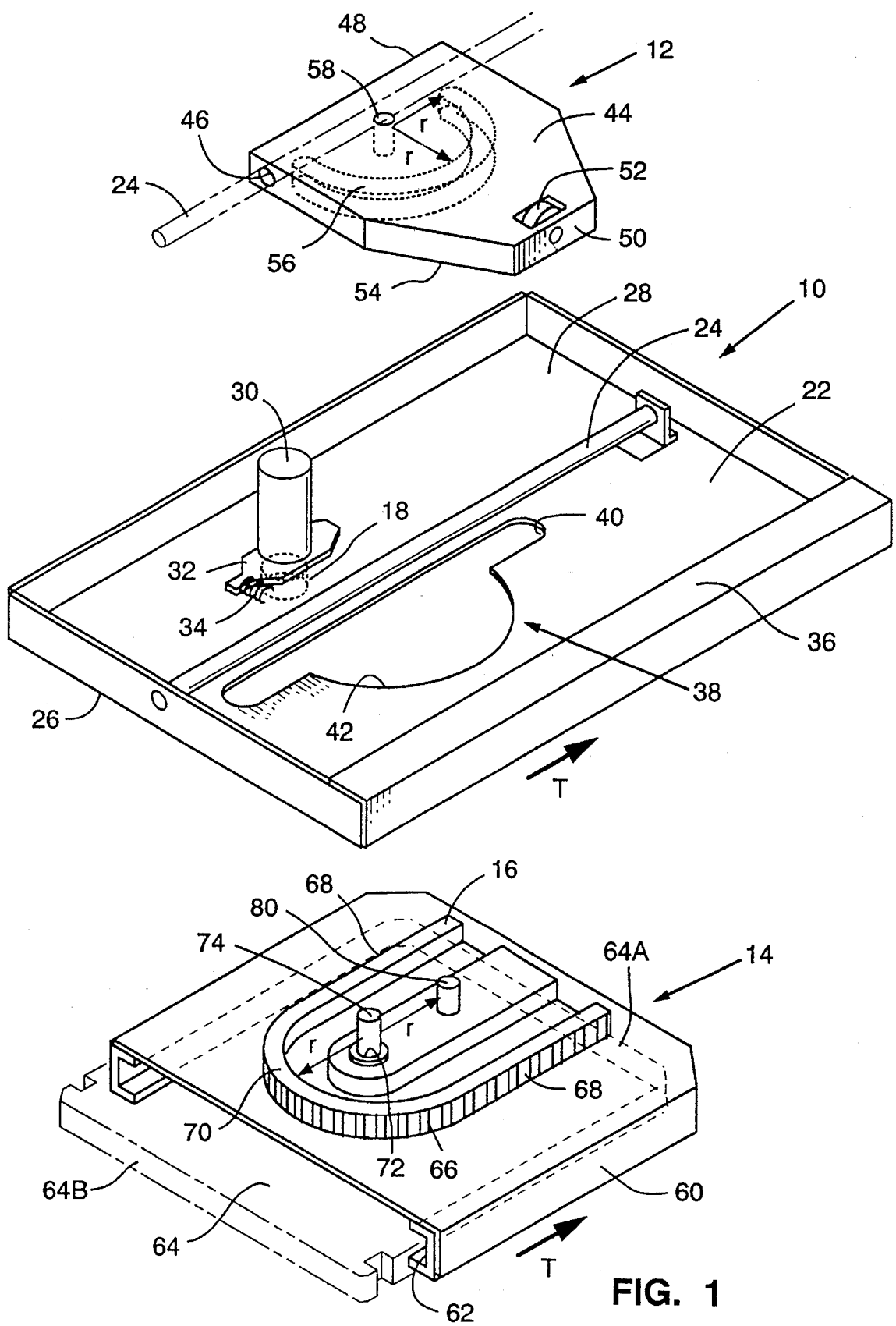
FIG. 1 is an exploded view of the preferred embodiment of the present invention.

The present invention is comprised generally of a base 10 having a pinion 18, a carriage 12 which is capable of sliding linearly along the base, and a carrier 14 which is rotatably connected to the carriage 12 and which has a rack 16 which is engaged with the pinion.

FIGS. 1 through 9 show the preferred embodiment of the present invention. Referring to FIG. 1, the base 10 is a rectangular tray 22 having a rail 24 attached to its top surface 28 and extending longitudinally within the tray. A motor 30 is attached to a motor mount 32 connected to the top surface 28 of the tray. The motor mount 32 is provided with a hole (not shown) through which a shaft (not shown) passes and engages with the pinion 18 positioned along the undersurface 26 of the tray. A spring 34 connecting one end of the motor mount 32 to the tray loads the pinion in a direction perpendicular to the rail.

Figure 2:
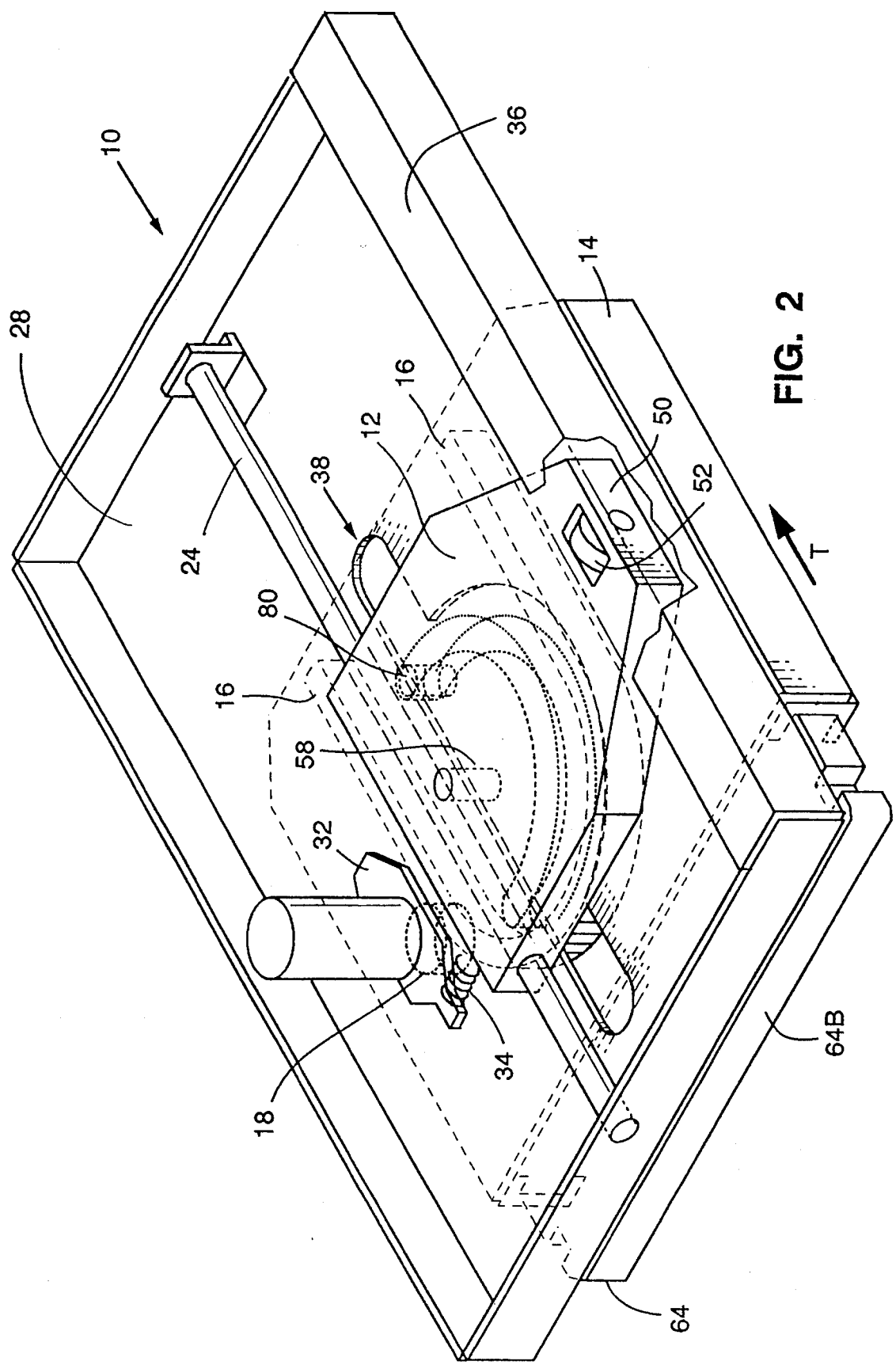
FIG. 2 is a partially cut away perspective view of the preferred embodiment of the present invention.

A roller 35 (FIG. 3) is connected at its axis to the undersurface 26 of the tray so as to allow it to spin about its axis. One side of the tray is formed into a lip 36 which runs the length of the tray, parallel to the rail as shown in FIGS. 1 and 2. As will be illustrated below, the rail and the lip form a track along which the carriage travels during operation. The tray has a cutout section 38 which includes an elongate portion 40 running parallel with the rail and a semicircular portion 42 extending laterally from the elongate portion.

The carriage 12 of the preferred embodiment is comprised of a six-sided plate 44 having a long side 48 and a short side 50 which are parallel to each other. A throughbore 46 passes through the plate 44 parallel to and proximal to the long side 48. The plate is slidably mounted on the rail 24 of the base 10, with the rail passing through the throughbore 46. A wheel 52 is mounted in the plate 44, close to the short side.

On the underside 54 of the carriage 12 is a semi-circular or arcuate slot 56. A first hole 58 is located at the center of the half circle defined by the slot.

The carrier 14 is comprised of a square box 60 having a slot 62 for receiving and holding a compact disc cartridge 64. A rack 16, having teeth 66 along its outer periphery, is mounted to the upper surface of the box. The rack 16 has two straight portions 68 and a semi-circular portion 70. The radius r defining the semi-circular portion is equal to the radius defining the semi-circular slot 56 of the carriage 12. A second hole 72 is positioned at the center of the half circle defined by the semi-circular portion 70 of the rack, and a peg-like connector 74 passes through the hole from the underside of the box. A peg 80 is mounted to the box 60 at a distance equal to the radius r of the semi-circular portion of the rack, measured from the second hole 72 along a line running parallel to the straight portions of the rack.

FIG. 2 shows the apparatus in assembled form. When the apparatus is assembled, the carriage 12 is mounted on the rail 24 such that the underside 54 (FIG. 1) of the carriage is proximal to the top surface 28 (FIG. 1) of the tray 22, and such that the first hole 58 is always above the cutout section 38 of the tray. A connector 74 (FIG. 5) having its head 76 located below the top plate 78 of the box 60, passes through the second hole 72 (FIG. 1), through the cutout portion 38 of the base 10 and connects with the first hole 58 of the carriage 12. The connection between the second and first holes is one which allows the carrier 14 to rotate about the connector relative to the carriage 12.

The peg 80 is loosely situated within the semi-circular slot 56 of the carriage 12 so as to allow the peg to travel within the slot during o rotation. The teeth (not shown) of the pinion 18 engage with the teeth (not shown) of the rack 16, and the roller 35 (FIG. 3) abuts the inside perimeter of the rack. The spring 34 connected to the motor mount 32 biases the pinion 18 against the rack. The short side 50 of the carriage 12 and the wheel 52 are positioned underneath the lip 36 of the base 10.

Figure 3:
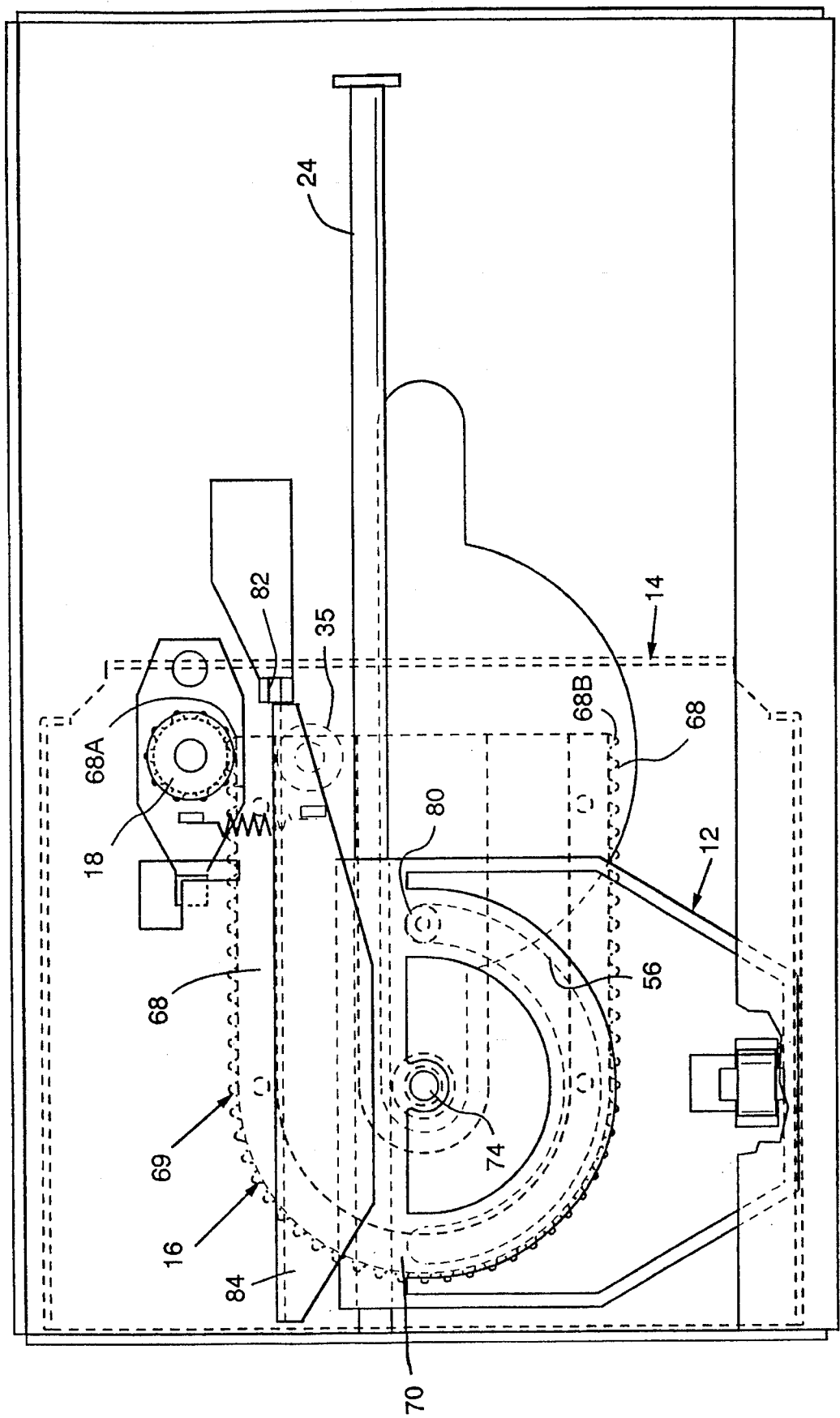
FIG. 3 is a top view of the preferred embodiment showing the carriage at the beginning of its travel.
Figure 7:
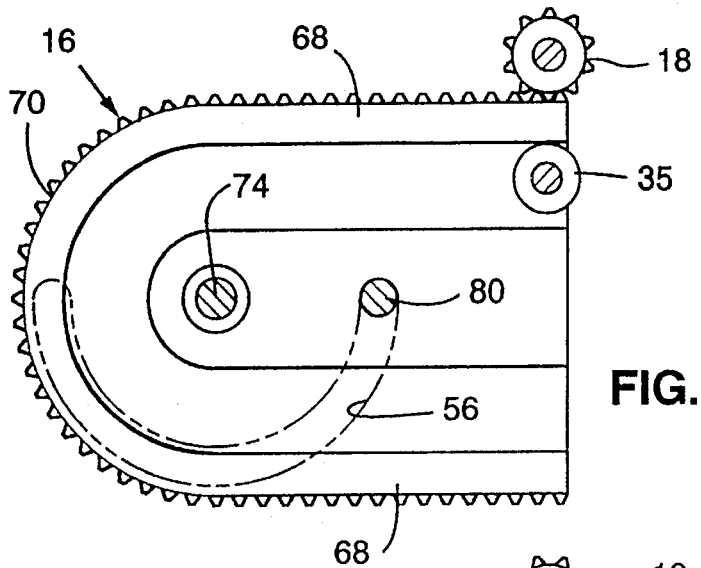
FIGS. 7, 8 and 9 are top views of the rack and pinion showing the progression of the rack position as it translates and rotates.

Operation of the device will next be described. Referring to FIG. 3, operation begins with the carriage 12 and carrier 14 positioned such that the pinion 18 and roller 35 engage rack 16 at end 68A of one of its straight portions 68. When the carriage 12 and carrier 14 are in this position, the peg 80 of the carrier 14 is located at one end of the semi-circular slot 56 in the carriage 12 (FIG. 7). The motor (not shown) spins the pinion 18 about its axis, propelling the carrier 14 relative to the pinion due to the engaged teeth of the rack and pinion. Because the carrier 14 and the carriage 12 are connected by the connector 74, the linear movement of the carrier 14 causes the carriage 12 to travel in the same direction along the rail 24.

Translation continues until rack portion 69 (where the straight portion 68 ends and the semi-circular portion 70 begins) reaches the pinion 18. Then, engagement of rotating pinion 18 with semi-circular portion 70 (with roller 35 on the opposite side of rack 16 from pinion 18) causes the carrier 14 to rotate by 180° about the connector 74. Carriage 12 does not move during the rotation phase because it is mounted on rail 24.

Figure 4:
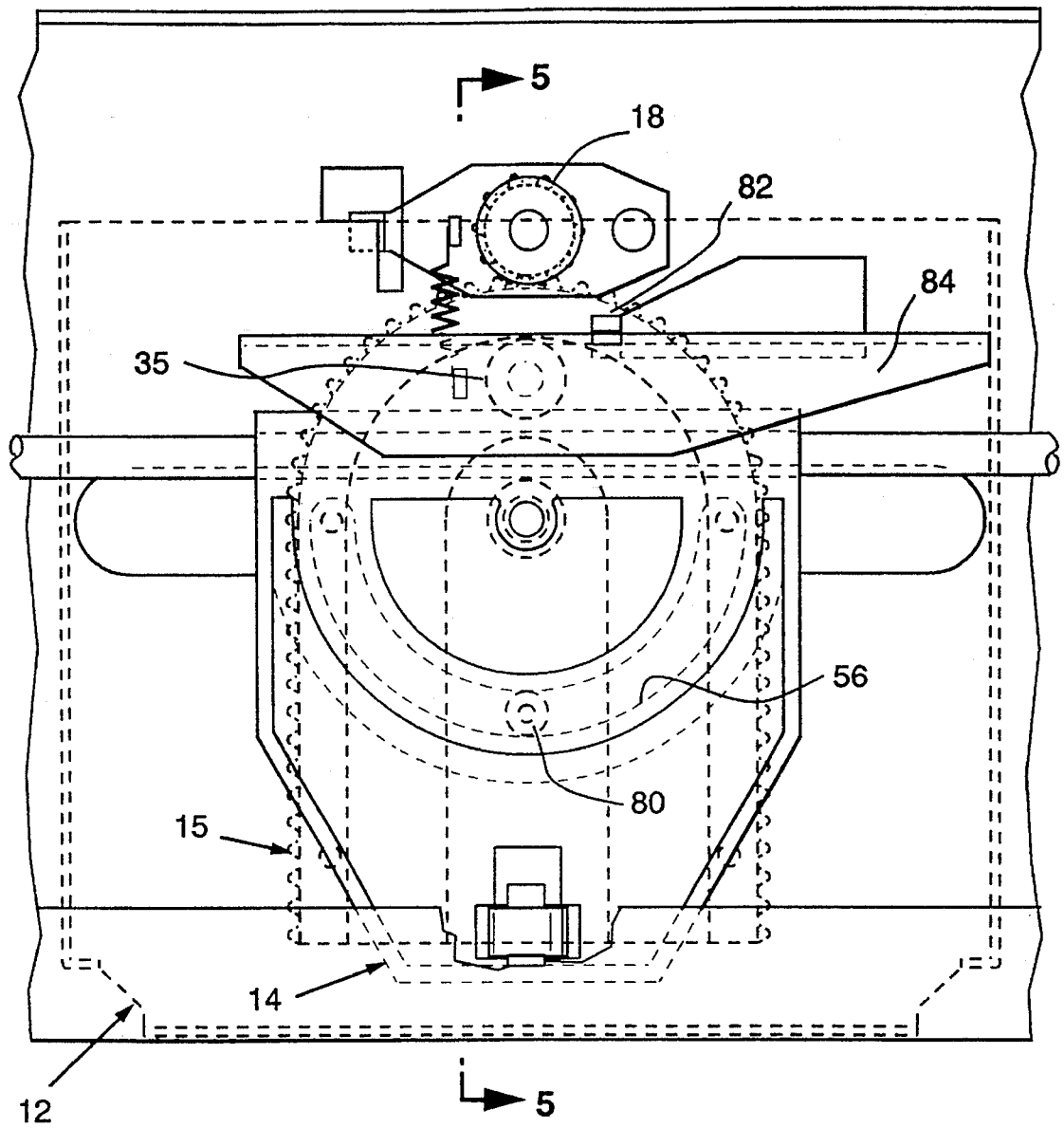
FIG. 4 is a top view of the preferred embodiment showing the carriage mid-way through its travel and the carrier in a rotated position of 90°.
Figure 5:
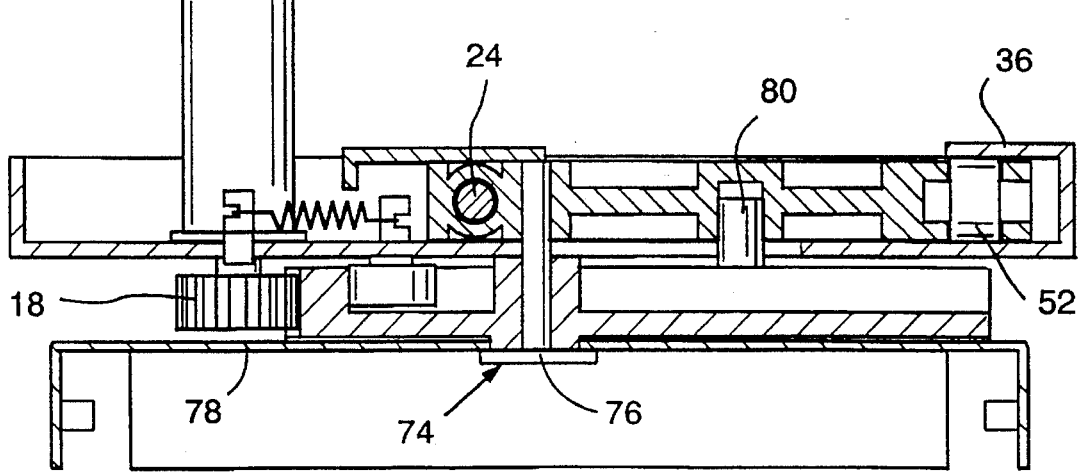
FIG. 5 is a side section view taken along the plane defined by 5—5 in FIG. 4.
Figure 6:
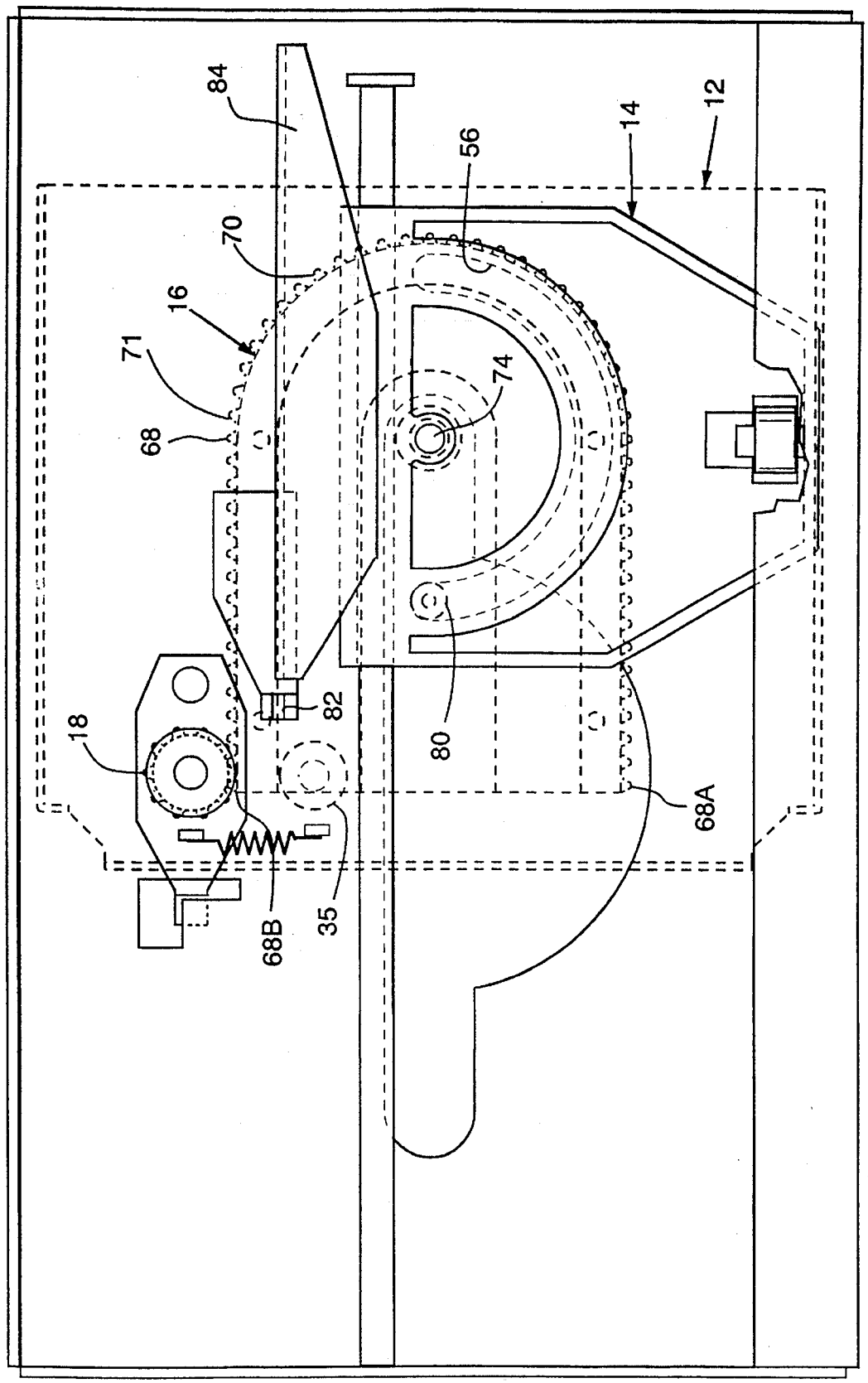
FIG. 6 is a top view of the preferred embodiment showing the carriage at the end of its travel.
Figure 8:
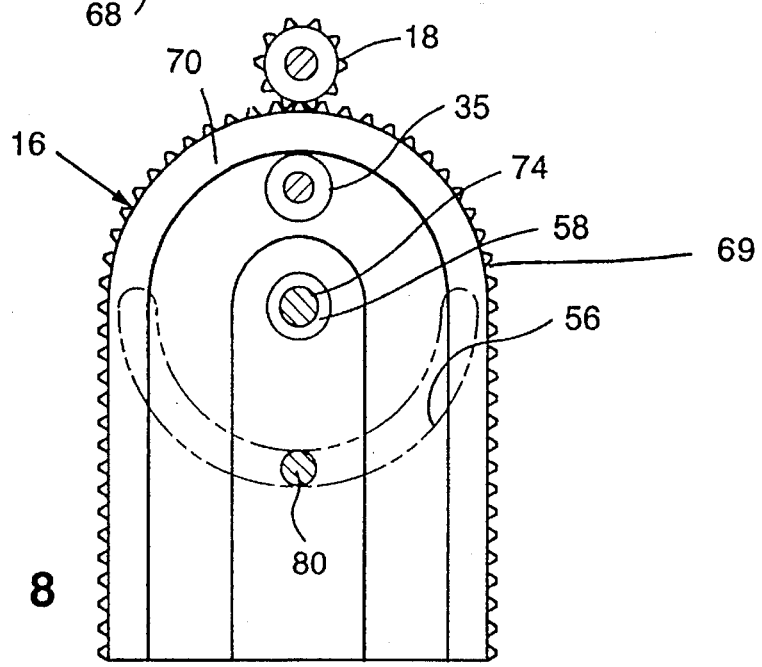
Figure 9:
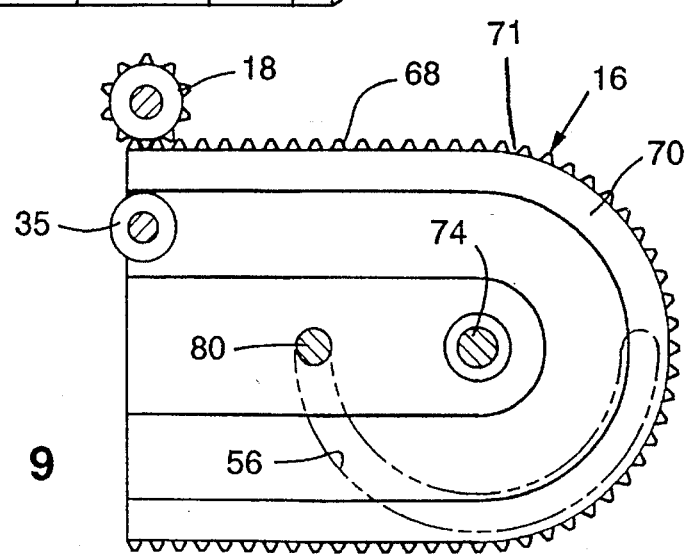

During rotation, the peg 80 of the carrier 12 travels in the semi-circular slot 56 of the carriage 14. As shown in FIGS. 4 and 8, when the rack 16 and pinion 18 have caused the carrier 12 to rotate by 90°, the peg 80 has traveled in a 90° arc along the semi-circular slot 56. As shown in FIGS. 6 and 9, once the rack and pinion have rotated the carrier 12 by 180°, the peg has traveled 180° along the semi-circular slot. After the 180° rotation, rack portion 71 (where the semi-circular portion 70 of the rack ends and the second straight portion 68 begins) engages with pinion 18, and pinion 18 causes translation to continue in the original direction of translation until rack end 68B of the rack reaches the pinion as in FIGS. 6 and 9.

Various means may be employed to stop the carrier at the end of its travel. In the preferred embodiment, an optical sensor 82 (FIG. 3) is mounted to the base 10. A vane 84 connected to the long side 48 of the carriage 12 interrupts the optical sensor during translation and rotation (see FIG. 4), while the optical sensor 82 is uninterrupted at each limit of travel (see FIGS. 3 and 6). When the optical sensor is uninterrupted, power to the motor 30 is cut off.

An important advantage of the invention is that it enables cartridge 64 (which can be a disk cartridge enclosing an optical or other disk) to be inserted into carrier 14 with its shutter face 64A first (with shutter face 64A facing the direction T in which carrier 14 will travel linearly, as shown in FIGS. 1 and 2), and its back face 64B (opposite shutter face 64A) last. Rotation of the carrier 14 and cartridge 64 during engagement of pinion 18 with curved portion 70 of the rack results in 180° rotation of cartridge 64, so that in its final position (shown in FIG. 6) shutter face 64A will face in the direction opposite that in which it originally was inserted into carrier 14 (i.e., in the direction opposite translation direction T shown in FIGS. 1, 2, and 6).

FIG. 10 shows an alternate embodiment of the present invention. In the alternate embodiment, a pair of rails 124 are mounted to the base 110. The carriage 112 is slidably mounted on the rails. The carriage 112 and the carrier 114 are rotatably joined at connector 174. Roller 135 is mounted to base such that it can rotate about its axis and such that it loads the rack 116 against the pinion 118. Rotation stops 186 prevent overtravel of the rotation. A cartridge 164 is inserted into carrier 114 with its shutter face 166A first. The carriage 112 and carrier 114 are initially positioned as in FIG. 10, with pinion 118 and roller 135 engaged with end 168A of one of straight portions 168 of rack 116. The motor spins the pinion 118, propelling the carrier 114 in a linear direction. Because the carrier 114 and the carriage 112 are connected by connector 174, the carriage 112 is carried along rails 124 by the movement of carrier 114. As with the preferred embodiment, engagement of semi-circular rack portion 170 with pinion 118 causes the carrier 114 to rotate 180° around connector 174. The carriage 112 remains stationary during rotation of the carrier 114, and then resumes linear travel along with the carrier 114 once the second straight portion 168 of rack 116 engages with pinion 118. At the end of rotation, the rack 116 abuts a rotation stop 186 which prevents overrotation of the carrier 114.

While two embodiments of translating and rotating devices have been described, many others are possible according to the present invention. The scope of the present invention is not intended to be limited to the specific embodiments described above but is rather defined by the claims recited below.

I claim:

1. An apparatus for translating and rotating a cartridge, the apparatus comprising:

a base;

a linear motion carriage slidably mounted to the base for translation in a direction of translation, the linear motion carriage having an arcuate slot having a center and being defined by a first radius of curvature measured from the center;

a carrier for carrying the cartridge, the carrier having a rotation point and rotatably mounted on the linear motion carriage for rotation about its rotation point;

a rack attached to the carrier, the rack having two straight sections in spaced parallel relation and a curved section connected between the straight sections, the curved section defined by a second radius of curvature measured from the rotation point;

a first peg connected to the carrier along a line extending from the rotation point in a direction parallel to the straight sections and away from the curved section, the first peg positioned and dimensioned for riding in the arcuate slot;

a second peg rotatably connecting the linear motion carriage to the carrier, the second peg engaging the carrier at the rotation point of the carrier and engaging the carriage at the center of the arcuate slot;

a pinion rotatably mounted to the base in a position for cooperating with the rack;

a roller for cooperating with the rack, the roller positioned such that the rack is between the roller and the pinion; and means for rotating the pinion.

2. The apparatus of claim 1 further comprising a rod having two ends mounted to the base, and wherein the linear motion carriage has a first end having a throughbore disposed around the rod for sliding thereon and a second end having a wheel positioned for rolling along the base.

3. An apparatus for loading and unloading a cartridge having a shutter on one face, said apparatus comprising:

a linear motion carriage slidable in a direction of translation, the linear motion carriage having an arcuate slot having a center and being defined by a first radius of curvature measured from the center;

a carrier for carrying the cartridge, the carrier having a rotation point and rotatably mounted on the linear motion carriage for rotation about its rotation point;

a rack attached to the carrier, the rack having two straight sections in spaced parallel relation and a curved section connected between the straight sections, the curved section defined by a second radius of curvature measured from the rotation point;

a first peg connected to the carrier along a line extending from the rotation point in a direction parallel to the straight sections and away from the curved section, the first peg positioned and dimensioned for riding in the arcuate slot;

a second peg rotatably connecting the linear motion carriage to the carrier, the second peg engaging the carrier at the rotation point of the carrier and engaging the carriage at the center of the arcuate slot;

a pinion for cooperating with the rack;

a roller for cooperating with the rack, the roller positioned such that the rack is between the roller and the pinion; and means for rotating the pinion.

4. The apparatus of claim 3 further comprising optical sensing means for detecting when the linear motion carriage has traveled a predetermined distance and for initiating a signal for stopping rotation of the pinion once the linear motion carriage has traveled the predetermined distance.

5. An apparatus for translating and rotating a cartridge, the apparatus comprising:

a base;

a linear motion carriage slidably mounted to the base for translation in a direction of translation, the linear motion carriage including an arcuate slot;

a carrier having a rotation point, the carrier rotatably mounted on the linear motion carriage for rotation about its rotation point, for carrying the cartridge, the carrier including a first peg capable of riding in the arcuate slot;

a rack attached to the carrier, the rack having two straight sections in spaced parallel relation and a curved section connected between the straight sections, the curved section defined by a radius of curvature measured from the rotation point;

a pinion rotatably mounted to the base in a position for cooperating with the rack;

a roller rotatably mounted to the base in a position for cooperating with the rack, the roller and pinion positioned on opposite sides of the rack; and means for rotating the pinion.

6. The apparatus of claim 5, further comprising a rail attached to the base wherein the linear motion carriage is slidable along the rail.

7. The apparatus of claim 6 wherein the means for rotating the pinion comprises a motor mounted to the base.

8. The apparatus of claim 6, further comprising a spring for loading the pinion against the rack.

9. The apparatus of claim 5, further comprising optical sensing means for detecting when the linear motion carriage has traveled a predetermined distance and for initiating a signal for stopping rotation of the pinion once the linear motion carriage has traveled the predetermined distance.

10. An apparatus for loading and unloading a cartridge having a shutter on one face, said apparatus comprising:

a linear motion carriage slidable in a direction of translation the linear motion carriage including an arcuate slot;

a carrier for carrying the cartridge, the carrier having a rotation point and being rotatably mounted at the rotation point to the linear motion carriage, the carrier having a first rotational orientation wherein the shutter is facing in a first direction and a second rotational orientation wherein the shutter is facing in a second direction, the second direction being opposite to the first direction, the carrier including a first peg dimensioned for riding in the arcuate slot;

a rack attached to the carrier, the rack having two straight sections in spaced parallel relation and a curved section connected between the straight sections the curved section defined by a radius of curvature measured from the rotation point;

a pinion rotatably mounted on an axis, for cooperating with the rack such that cooperation between the pinion and the straight sections will cause translation of the carrier and cooperation between the pinion and the curved section will cause rotation of the carrier from the first to the second rotational orientation;

a roller for cooperating with the rack, the roller positioned such that the rack is between the roller and the pinion; and means for rotating the pinion.

\* \* \* \* \*